Oct. 13, 1936.   C. W. FROEHLICH   2,057,300
FRUIT HALVING AND PITTING MACHINE
Filed Nov. 4, 1935   3 Sheets-Sheet 1
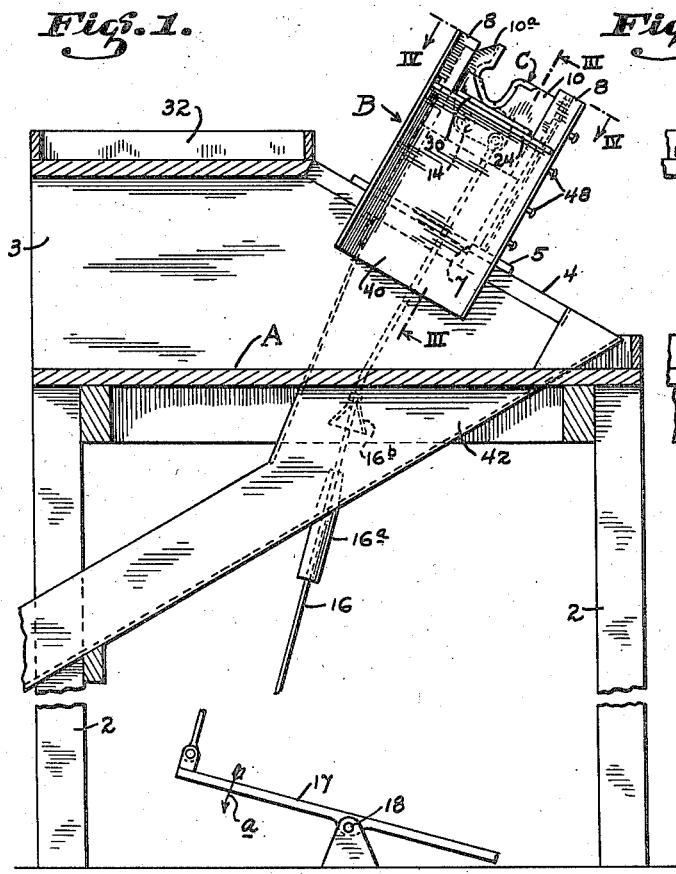
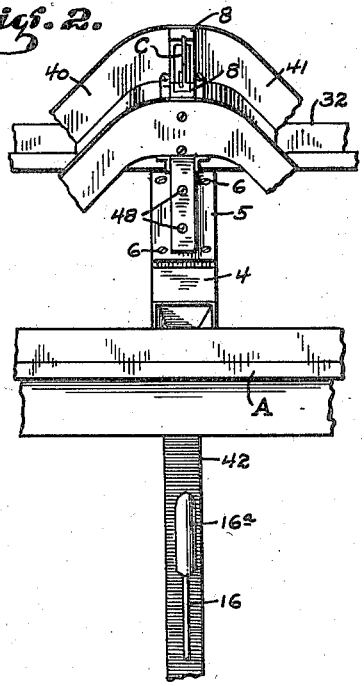
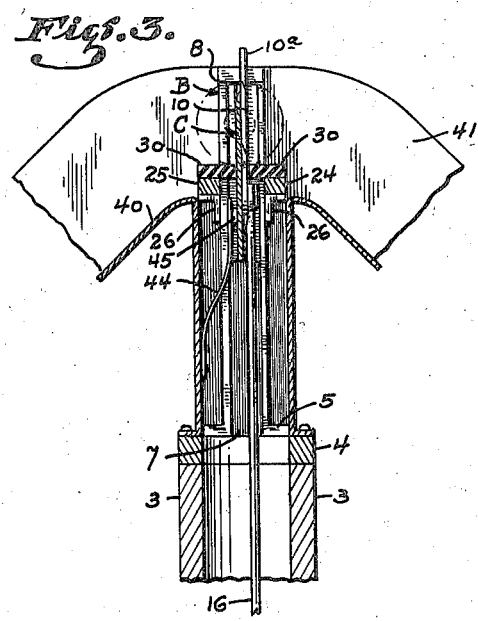
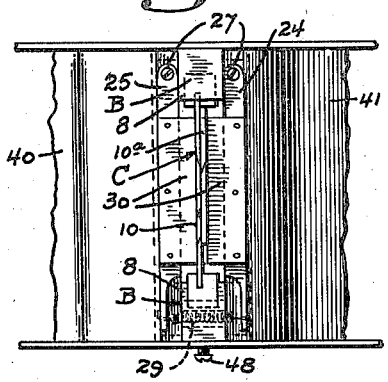
INVENTOR.
Charles W. Froehlich.
BY
Chas. E. Townsend.
ATTORNEY.

Patented Oct. 13, 1936

2,057,300

UNITED STATES PATENT OFFICE 2,057,300

FRUIT HALVING AND PITTING MACHINE

Charles W. Froehlich, Hayward, Calif.

Application November 4, 1935, Serial No. 48,069

4 Claims. (Cl. 146—17)

This invention relates to a machine for halving and pitting fruit containing pits, and particularly to a machine for halving and pitting cherries.

The object of the present invention is generally to improve and simplify the construction and operation of fruit halving and pitting machines; to provide a pair of cutting blades whereby the fruit is cut into halves, said blades having cooperating recesses formed therein to embrace and grip the pit after the fruit is halved; to provide means for separating the half sections of fruit with relation to the pit and for discharging the halved sections of fruit; to provide means for removing the pit from between the knives and for discharging the same separately from the fruit; and, further, to provide a foot treadle whereby the several operations of halving the fruit, separating the halves from the pit, removal of the pit, etc., are controlled.

The fruit halving and pitting machine is shown by way of illustration in the accompanying drawings, in which—

Fig. 1 is a side elevation of the machine partially in section;

Fig. 2 is a partial front view of the machine;

Fig. 3 is an enlarged, vertical, cross section taken on line III—III of Fig. 1;

Fig. 4 is a plan view of the cutter head and guide frame taken on line IV—IV of Fig. 1;

Figure 5:
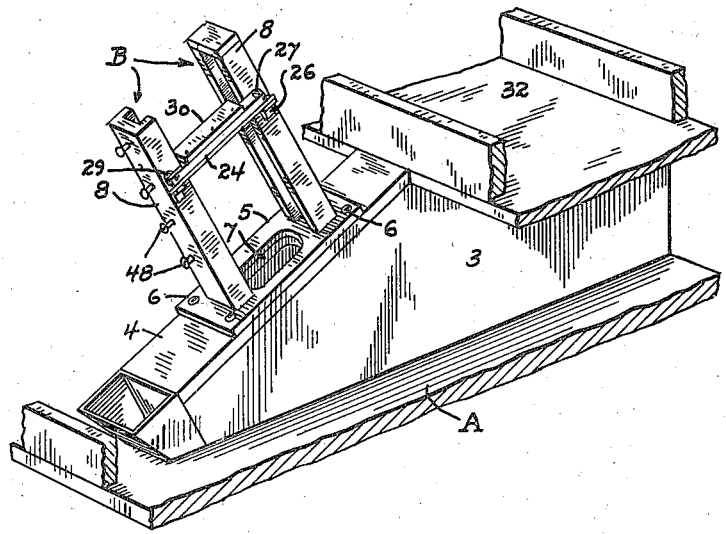
Fig. 5 is a perspective view of the guide frame.
Figure 6:
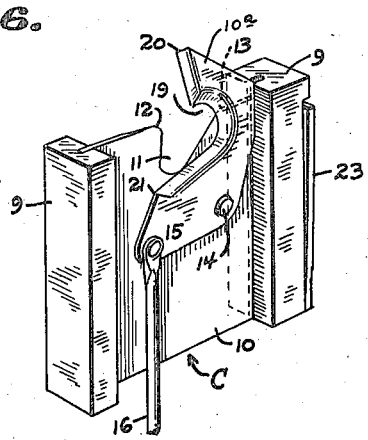
Fig. 6 is a perspective view of the cutter head.

Referring to the drawings in detail, and particularly Figs. 1, 5 and 6, A indicates a table top supported by legs 2—2. Secured to the table top are a pair of closely spaced planks 3—3, the forward ends of which are cut on an angle and are covered by a plank or board 4 placed crosswise thereof and secured thereto. This board forms a support for a guide frame generally indicated at B, see Fig. 5, said frame consisting of a base plate 5 secured to the board 4, as at 6. This plate is provided with a central opening 7 and it forms a support for a pair of channel-shaped uprights 8—8, in which is slidably mounted a cutter head generally indicated at C, see Fig. 6.

The cutter head consists of a pair of shoes 9—9, which are connected by a plate 10. The upper edge of this plate is recessed, as shown at 11, and the entire upper edge from the point 12 to the point 13 is ground to form a cutting edge. The plate 10 thus forms one of a pair of cutting blades. The second cutting blade is indicated at 10ᵃ. It is pivotally attached to the blade 10, as at 14, and is provided with a lever arm extension 15 to which is connected a link 16, the opposite end of said link being connected to a foot treadle 17 pivoted as at 18. The pivoted blade 10ᵃ is recessed, as shown at 19, and the entire edge from the point 20 to the point 21 is ground to form a cutting edge. One of the shoes 9 of the cutter head is provided with a spring arm 23, which functions as a friction shoe, as will hereinafter be described.

The cutter head is disposed between the uprights 8—8 and is guided in the channel-shaped grooves formed in said uprights. The cutter head is reciprocally mounted in an upward and downward direction between the uprights 8—8, said reciprocal movement being transmitted through the foot treadle and the links 16, as will hereinafter be described. The uprights 8—8 besides forming a guide and support for the cutter head also form a pair of bars 24 and 25. Angle brackets 26 are carried by one of the uprights 8 and these brackets form pivotal supports, such as shown at 27 for the respective bars. A hole is drilled through the opposite upright 8 and a spring 29 passes through said hole and is connected to the opposite ends of the bars 24 and 25 so as to permit yielding movement and separation of the bars under certain operations.

The bars serve the function of separating the fruit from the pit and this is accomplished by placing and securing a rubber flap 30 on each of the bars 24 and 25, said bar extending inwardly between the uprights 8—8 and contacting the faces of the cutting blades 10 and 10ᵃ.

Figure 8:
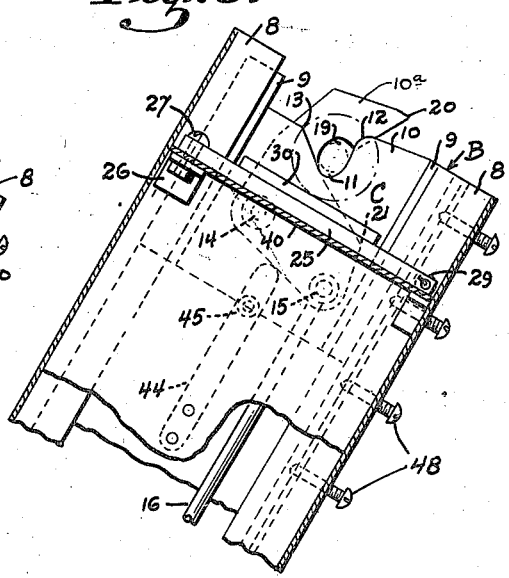

In actual operation a tray, such as shown at 32, will be placed on top of the closely spaced planks 3—3 and the cherries to be halved and pitted will be placed in the tray. The girl, or other operator, running the machine will be seated in front thereof and will place one foot on the treadle 17. The operator will first take a single cherry from the tray and will push it down over the cutting edge of the plate 10 until the pit lodges in the recess 11. This operation cuts one-half of the cherry and by pressing downwardly on the treadle in the direction of arrow a, see Fig. 1, a pull will be exerted on the link 16 which will first cause the pivoted plate 10ᵃ to swing about its pivot and assume the position shown in Fig. 8. This operation cuts the other side of the cherry and it is now completely halved and it will, furthermore, be noted that the pit will be enclosed and gripped by the recess portions 11 and 19 of the respective plates. Further downward movement by pressure on the treadle will cause the entire cutter head to move downwardly between the uprights 8—8 to assume the position shown in Fig. 9. During such downward movement the cutting blades gripping the pit will be pulled downwardly and below the rubber flaps 30. During this downward movement the two halved sections of the cherry will be separated from the pit and will drop onto a chute divided into two sections, as indicated at 40 and 41, see Figs. 2 and 3, and these chutes will direct the two separated halves of the cherry onto the table top A where they will collect and from where they may be removed from time to time.

Figure 7:
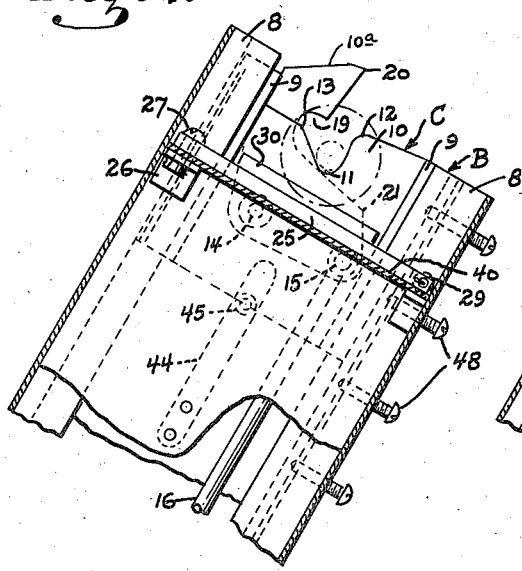
Figs. 7, 8, 9 and 10 are vertical sections of the guide frame and cutter head, showing the different positions assumed by the cutter head during the operation of the machine.

To remove or release the cherry pit which is grasped between the knife blades, it is only necessary to impart a rocking movement to the treadle in a direction opposite to the arrow $a$. Such movement will swing the blade $10^a$ back to normal or open position, or that shown in Fig. 10, and the cherry will be released and will fall by gravity into a chute indicated at 42. Further movement of the treadle in the same direction will return the cutting head to its upper or normal position shown in Figs. 1 and 7, when the next cherry will be inserted and the operation repeated.

In some instances the cutting edges of one or another of the blades tend to cut into the pit, and when the pit is released by opening of the blades, it will adhere to one or another of the blades and will not fall out. To remove the pit in instances of this kind, a spring arm 44 is provided, see Fig. 3. This arm is secured at its lower end to a chute section 40. Its upper end has a button-like projection 45 formed thereon which will engage the pit and force it outwardly from between the plates, and it will thus drop down into the chute 42 and be removed.

The spring 29, which connects the bars 24 and 25, as previously stated, permits swinging movement of the bars about their pivots 27. This movement takes place when the pit passes between the rubber flaps 30, hence yielding movement of the flaps and the arms is more or less essential and the spring permits such movement and returns the bars and the flaps to normal position the moment the pit is pulled through.

Figure 9:
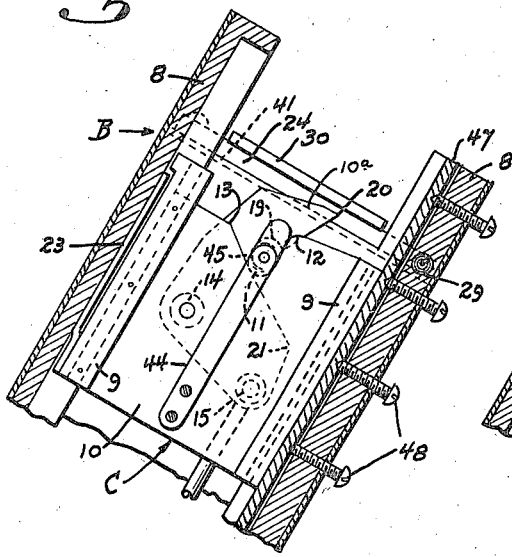
Figure 10:
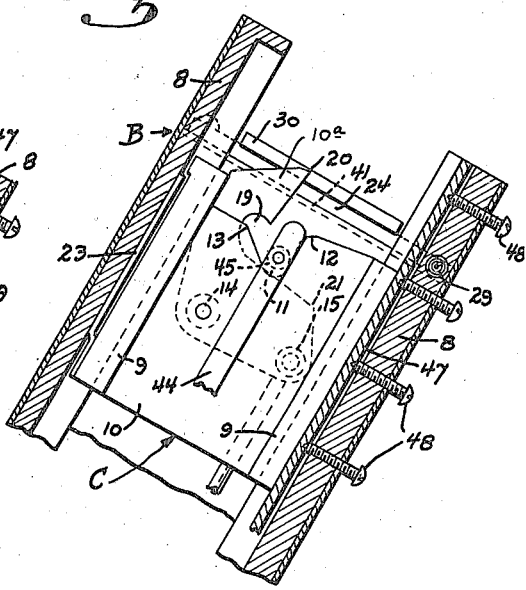

In Figs. 9 and 10 it will be noted that one of the uprights 8 is provided with a gib, such as shown at 47, and that screws 48 engage the same to permit adjustment thereof. This is more or less essential as the cutter head must be maintained under a certain friction to permit proper operation. That is, the friction between the cutter head and the guideways in which it travels must be sufficiently great to permit pivotal movement of the plate $10^a$, either to open or close it with relation to the cooperating cutter blade 10 before vertical movement is imparted to the cutter head. Thus, during the first operation, if the cherry has been inserted between the blades the first downward movement of the treadle merely swings the blade $10^a$ about its pivot and first cuts one-half side of the cherry and then grasps the pit, thereafter further downward movement of the treadle will exert a pull to cause the entire cutter head to move downwardly below the flaps 30. On the return or upward movement, when the treadle is depressed in a direction opposite to arrow $a$, the first movement must again impart pivotal movement to the blade $10^a$ to open it with relation to the blade 10, so as to permit release of the pit, hence frictional resistance between the cutter head and its guideways is essential to insure such movement. Further movement after the blade $10^a$ has been opened will cause upward movement of the cutter head between the uprights 8 and return of the cutter head to its normal and uppermost position. The adjustability of the gib 47 is, accordingly, obvious and so is the use of spring or friction shoe indicated at 23.

By referring to Fig. 1, it will be noted that the link 16 passes through a sleeve $16^a$ in the bottom of the cherry pit receiving chute. This is to prevent juices liberated during the cutting and halving of the cherries from leaking down along the link and wetting the feet of the operator. A certain amount of juice might run down the link and between the sleeves 16 and it is to prevent this that a cup-shaped member $16^b$ is placed on the link just above the sleeve $16^a$ so as to prevent a leakage at this point.

From the foregoing it will be noted that the machine first of all cuts or halves the cherry, or other fruit to be pitted; secondly, it grasps the pit; third, it separates the fruit from the pit; and, fourth, it discharges the pit separately from the fruit and all operations are controlled by the foot treadle and, thus, are at all times under control of the operator. Hence, the operator can work with any speed desired and can control each operation.

The mechanism is exceedingly simple, both in construction and operation, and practically any one skilled, or otherwise, can perform the operations.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. In a fruit halving and pitting machine of the character described, a guide frame, a cutter head slidably mounted on the frame, a stationary cutter blade in the head, a pivoted blade in the head, said blades having recesses formed therein to embrace and grip the fruit pit, means for imparting movement to the pivoted blade to cut a fruit placed between the blades into two halves and to grip the pit, friction means for holding the cutter head against movement when movement is imparted to the pivoted blade, said means for imparting movement to the pivoted blade exerting a downward pull against the friction holding means, and pulling the cutter head downwardly in the guide frame after the fruit has been halved and the pit gripped.

2. In a fruit halving and pitting machine of the character described, a guide frame, a cutter head slidably mounted on the frame, a stationary cutter blade in the head, a pivoted blade in the head, said blades having recesses formed therein to embrace and grip the fruit pit, means for imparting movement to the pivoted blade to cut a fruit placed between the blades into two halves and to grip the pit, friction means for holding the cutter head against movement when movement is imparted to the pivoted blade, said means for imparting movement to the pivoted blade exerting a downward pull against the friction holding means and pulling the cutter head downwardly in the guide frame after the fruit has been halved and the pit gripped, and a pair of rubber strips carried by the frame between which the cutter head passes during downward movement, said strips engaging the opposite faces of the cutter head and separating the cut halves of the fruit from the pit but permitting the pit to pass between them.

3. In a fruit halving and pitting machine of the character described, a guide frame, a cutter head slidably mounted on the frame, a stationary cutter blade in the head, a pivoted blade in the head, said blades having recesses formed therein to embrace and grip the fruit pit, means for imparting movement to the pivoted blade to cut a fruit placed between the blades into two halves and to grip the pit, friction means for holding the cutter head against movement when movement is imparted to the pivoted blade, said means for imparting movement to the pivoted blade exerting a downward pull against the friction holding means and pulling the cutter head downwardly in the guide frame after the fruit has been halved and the pit gripped, a pair of rubber strips carried by the frame between which the cutter head passes during downward movement, said strips engaging the opposite faces of the cutter head and separating the cut halves of the fruit from the pit but permitting the pit to pass between them, and a stationary spring arm in the path of movement of the cutter head and engageable with one side thereof to remove the pit from between the cutter blades when the cutter head starts movement in an upward direction.

4. In a fruit halving and pitting machine of the character described, a guide frame, a cutter head slidably mounted on the frame, a stationary cutter blade in the head, a pivoted blade in the head, said blades having recesses formed therein to embrace and grip the fruit pit, a link connected with the pivoted blade to swing the pivoted blade to and away from the stationary blade, friction means normally holding the cutter head against sliding movement in the guide frame, a foot treadle by which the link is actuated, said treadle and link during movement in one direction first swinging the pivoted blade towards the stationary blade and then pulling the cutter head downwardly in the guide frame and during a reverse movement first swinging the pivoted blade away from the stationary blade and then pushing the cutter head upwardly in the guide frame to a raised fruit receiving position, a pair of yieldable rubber strips carried by the frame and disposed one on each side of the movable cutter head between which the cutter head passes when pulled in a downward direction, said strips engaging the opposite sides of the cutter head and separating the cut halves of the fruit from the pit but permitting the pit to pass between the strips.

CHARLES W. FROEHLICH.